Sept. 21, 1937.  R. M. HEINTZ  2,093,443
TRAILING LINE STABILIZER
Filed Jan. 21, 1935

INVENTOR.
RALPH M. HEINTZ.
BY Lippincott + Metcalf
ATTORNEYS.

Patented Sept. 21, 1937

2,093,443

UNITED STATES PATENT OFFICE 2,093,443

TRAILING LINE STABILIZER

Ralph M. Heintz, Palo Alto, Calif., assignor to Heintz & Kaufman, Ltd., San Francisco, Calif., a corporation of Nevada Application January 21, 1935, Serial No. 2,683

3 Claims. (Cl. 250—33)

My invention relates to the stabilization of trailing lines and is particularly adapted for use in conjunction with aircraft.

Trailing lines, either of cord or wire are used with aircraft for various purposes. It is often necessary in lighter-than-air dirigibles and the like to trail landing lines, or cords that can be used to secure landing lines. One of the most important examples of a trailing line, however, is an airplane radio antenna, in the majority of cases composed of copper wire.

Trailing antennas are almost universally used because the plane itself does not occupy a sufficient volume in space to provide for an efficient radiator, and the usual custom is to bond all metal parts of the aircraft, and balance against a trailing antenna wire, energizing the radiator between the two portions.

Trailing wires, however, present a problem. Vibrational waves are set up in the wire, the free end whips, and in practically all cases is progressively broken off because of fatigue of the metal. As such radiators are commonly tuned and thus supposed to remain of constant dimensions, breakage changes the tuning, lowers the radiation and at times prevents operation entirely.

Such whipping and breakage has heretofore been reduced to a minimum by the use of a terminal fish, as it is called, of heavy material preferably lead, shaped into a rough streamlined form. This fish effectively stabilized the free end of the trailing wire, but was highly dangerous for several reasons. It is invisible to other aircraft and of sufficient weight to break a propeller or other portion thereof if contacted. It could not be firmly attached to the trailing wire because of the possibility of a landing being made with the wire extended, the fish winding around ground objects and, through the wire, throwing a strain on the attached aircraft which might well prove fatal.

Such fish, therefore, were usually fastened on the trailing wire with a breaker link so that a small strain would part the fish from the wire. This in turn led to loss of the weight in mid-air with consequent unwelcome and frequently embarrassing bombing of its landing place. Such accidents were frequent during the world war, both in training and at the front.

Even with a breaker link, landing any aircraft with a trailing weight attached would be likely to cause damage to persons and property on the ground, even though the weight were freed from the aircraft on impact.

It is, therefore, the principal object of my invention to provide a means and method of stabilizing trailing lines without the use of weights as heretofore used.

A further object is to provide for automatic neutralization of whipping moments in trailing lines.

Another object of my invention is to reduce the danger element involved in trailing-line stabilization.

A still further object of my invention is to provide an improved aircraft antenna fish.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Figure 1:
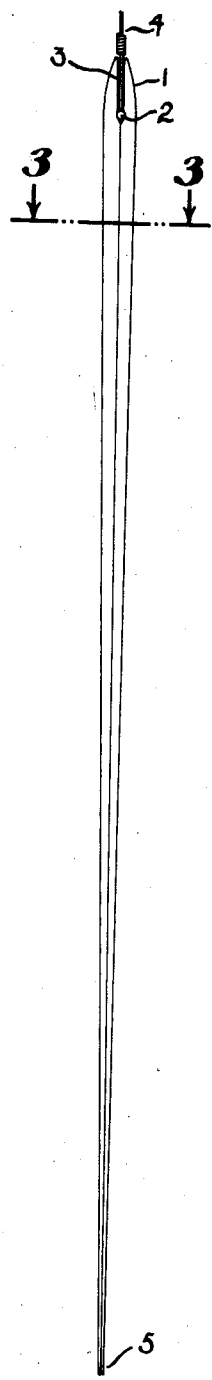
Figure 1 is a plan view of a preferred stabilizer of my invention in a position to present minimum air drag.
Figure 2:
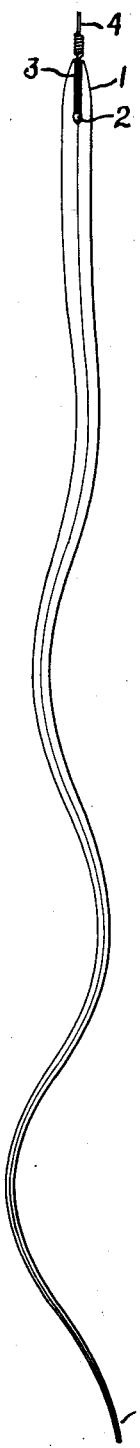
Figure 2 is a plan view of the stabilizer under whip.
Figure 3:
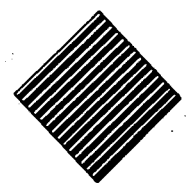
Figure 3 is an enlarged cross sectional view of the stabilizer taken as indicated by the line 3—3 in Figure 1.

In the preferred form of stabilizer illustrated, adapted for use in conjunction with an antenna wire trailing from high speed airplanes, the preferred material is soft rubber, highly flexible and stretchable, and having a resistance to fatigue much greater than the wire itself.

The stabilizer is highly streamlined and comprises a rounded head portion 1 provided with an attachment aperture 2 and groove 3 for the reception of the free end of an antenna wire 4. The remainder of the stabilizer tapers slowly in section from the head portion to a small tip 5. I prefer to use a square section except at the head, although other sections do not alter the operation of the device.

In practice I find that trailing wires attached to high speed planes are effectively stabilized by a device as described having a head diameter of one-half inch, a tip diameter of one-sixteenth inch, with an over-all length of three feet. While I prefer to use ordinary soft rubber, this rubber may be weighted throughout or locally if desired to fit special conditions without changing the action of the stabilizer and without raising the over-all weight to be dangerous.

The action of the device is simple and depends primarily on air drag and fatigue resistance. If the wire trails through the air with the stabilizer straight, as shown in Figure 1, no damage will occur to the wire, as oscillations too long in wavelength to curve the stabilizer appreciably do not tend to break or fatigue the wire.

When, however, the waves set up in the wire are short, such as would rapidly whip an unprotected wire end and break it off from fatigue, the stabilizer will bend and one or more half cycles will be included within the length of the stabilizer. While I do not wish to be bound by my explanation, I believe at least two factors combine to prevent continuous terminal whip. Any divergence of the stabilizer from a straight line causes a drag to be applied to the stabilizer along the diverging surface. This drag in itself tends to damp out the waves, and if the lateral presentation of the stabilizer is greater than the lateral aspect of the wire feeding the waves to the stabilizer, this damping in itself may be sufficient to prevent or greatly reduce terminal whip. In this case the stabilizer should have a greater lateral projected area per unit of length than that of the wire feeding it, but need not be stretchable.

I prefer, however, to enter an additional factor by using stretchable material as well. In this case the drag produced by the waves in the stabilizer causes the entire stabilizer to increase in length, thus changing the natural period of vibration of the stabilizer. After stretching, the waves setting up the drag are not in resonance with new natural period of the drag, are damped out, and the stabilizer straightens. As it does so drag is reduced, and the stabilizer returns to its original length. Each time waves start therein they become damped out and the net result is that the device trails without substantial whip, or at least without sufficient whip to break the stabilizer or the wire attached thereto. In any case, as the end of the stabilizer carries the waves of greatest amplitude, the resistance to fatigue of the material prevents breakage.

As the stabilizer of my invention weighs only a few ounces as compared with six to eight pounds of prior weights, danger is removed from the operation of the trailing lines, whip is effectively prevented and such lines retain their original length during flight.

I claim:

1. An aircraft aerial wire stabilizer comprising a terminal length of a material having the elastic qualities of soft rubber.

2. An aircraft aerial wire stabilizer comprising a terminal length of soft rubber.

3. A terminal drag for an aircraft aerial wire comprising a tapered length of soft rubber.

RALPH M. HEINTZ.